G. L. SCHOFIELD.
COOLING DEVICE FOR MOTOR DRIVEN VEHICLES.
APPLICATION FILED AUG. 26, 1918.
1,415,122.
Patented May 9, 1922.
2 SHEETS—SHEET 1.
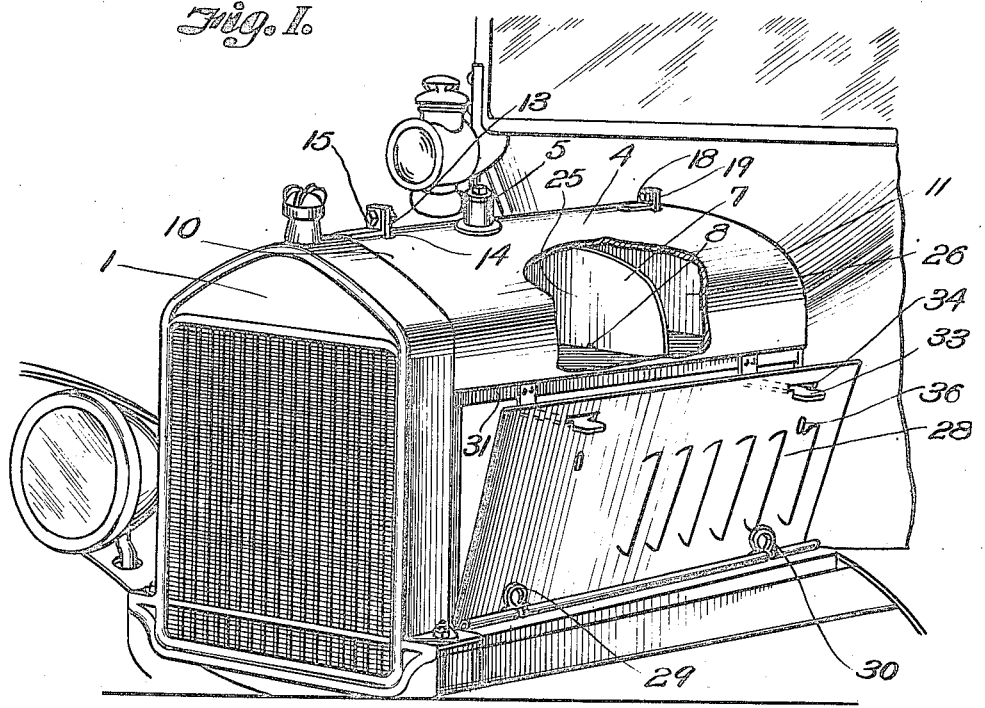
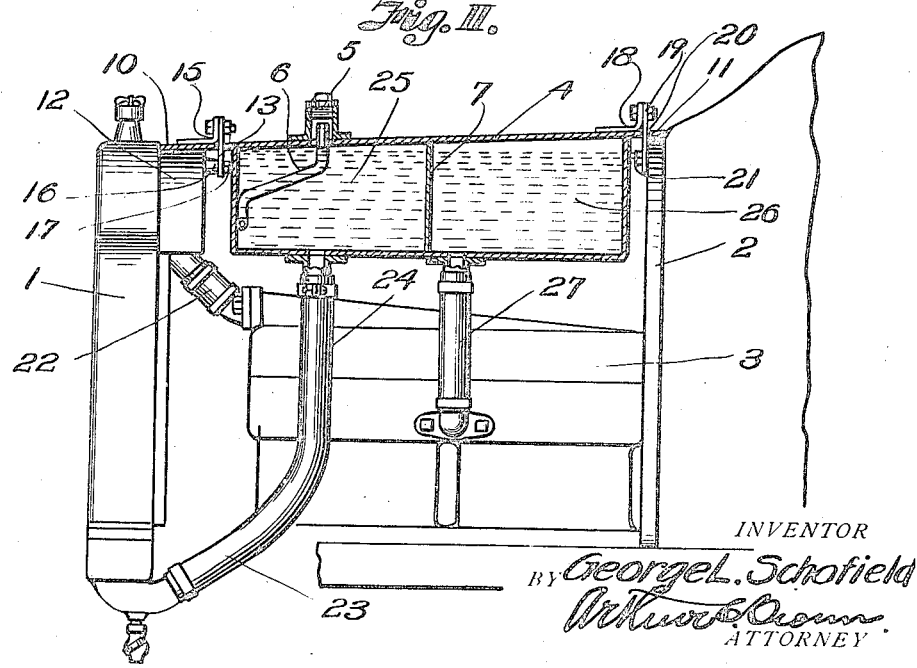
INVENTOR
BY George L. Schofield
ATTORNEY

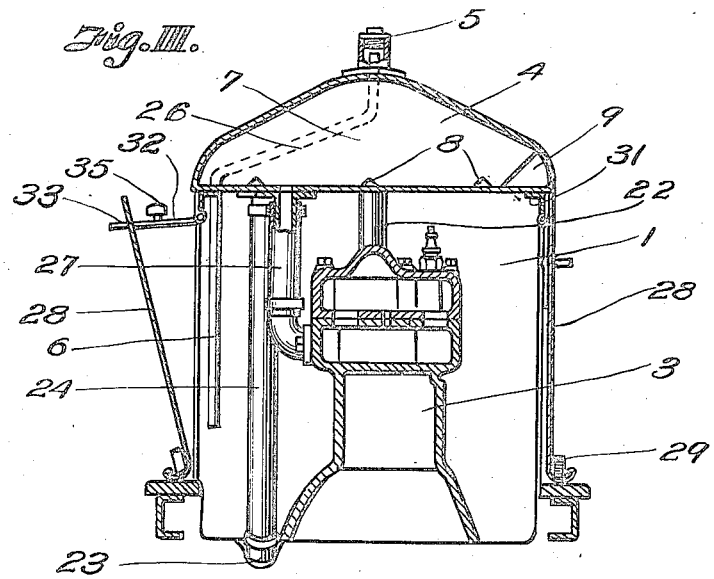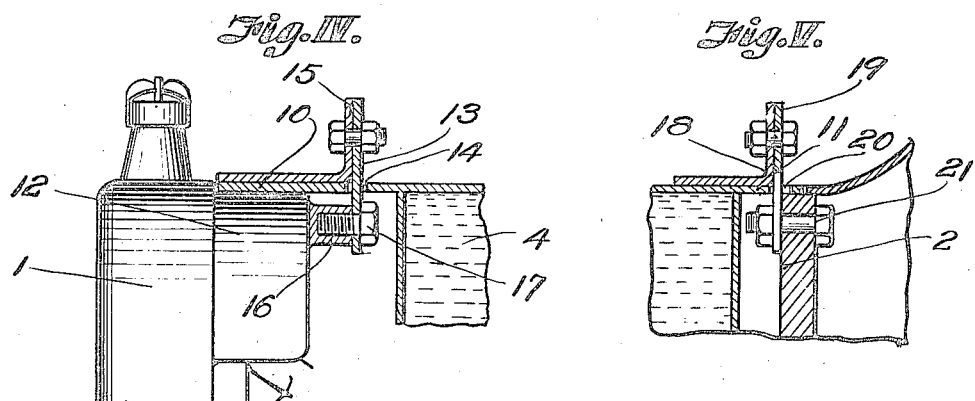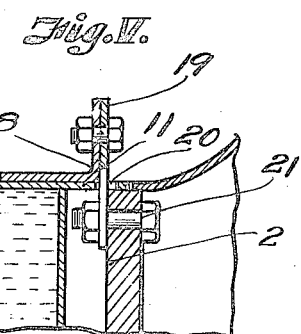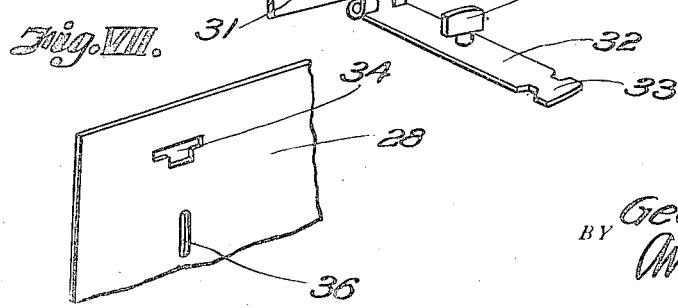

UNITED STATES PATENT OFFICE.

GEORGE L. SCHOFIELD, OF FREDERICK, MARYLAND.

COOLING DEVICE FOR MOTOR-DRIVEN VEHICLES.

1,415,122.   Specification of Letters Patent.   Patented May 9, 1922.

Application filed August 26, 1918. Serial No. 251,452.

*To all whom it may concern:*

Be it known that I, GEORGE L. SCHOFIELD, citizen of the United States, residing at Frederick, in the county of Frederick and State of Maryland, have invented certain new and useful Improvements in Cooling Devices for Motor-Driven Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to water cooled motors used in connection with motor vehicles, and one of the objects of the invention is to provide an auxiliary water reservoir to augment the supply ordinarily available from the radiator.

Motor vehicles usually have their radiators designed of sufficient capacity to supply cooling water for the engine under ordinary running conditions, but when the motor vehicle is used as a power plant, as for example in running tractors, saws and other mechanism for which they were not originally intended, the maximum demand on the motor is liable to extend over long periods, the result being that the normal water supply is insufficient to maintain the engine cool enough to permit a continuous operation. Therefore it not infrequently happens that the engine must be shut down at intervals with the attendant loss due to the inactivity of the machine and the operators.

I have provided means to augment the normal supply of water so that there will be a sufficient volume available to carry off the heat of the engine irrespective of a continuous maximum demand on the motor, thus eliminating the liability of loss due to delays before enumerated.

In carrying out my invention I prefer to arrange an auxiliary reservoir or tank of such form that it may constitute part of the hood between the radiator and the dash without destroying the symmetry of design or general appearance of the type of car to which it is attached.

In the drawings:

Fig. I is a perspective view of the front of the motor vehicle to which my invention is applied.

Fig. II is a longitudinal sectional view through the tank, the engine and radiator being shown in elevation.

Fig. III is a cross sectional view through the engine and tank.

Fig. IV is an enlarged detail sectional view through the forward fastening means for the tank.

Fig. V is a similar view with a rear fastening means.

Fig. VI is a fragmentary perspective view of the fastening means for the hood.

Fig. VII is a fragmentary perspective view of a portion of the hood.

Referring now to the drawings by numerals of reference:

1 designates a radiator and 2 the dash which constitute the ends of the hood between which is the usual engine 3.

4 designates a reservoir or tank having a filler cap 5 and an over-flow pipe 6. The tank is preferably divided by a partition 7 extending transversely thereof and provided with through openings 8 and 9 whereby communication may be had between the compartments. The ends of the tank are provided with longitudinal extending flanges 10 and 11, the forward flange 10 resting upon the offset 12 of the radiator 1 and secured thereto by a tie bar 13 passing through a slot 14 in the flange 10, one end of the tie bar being fastened to the angle 15 or top of the tank and the other end to the boss 16 on the offset 12 by the headed screw 17.

At the rear of the tank is an angle 18 to which a tie bar 19 is attached which passes through a slot 20 in the flange 11 and which is fastened to the dash 2 by a through bolt 21. 22 is an outlet pipe for the engine which communicates with the hollow offset portion 12 of the radiator 1, said radiator being provided with the usual outlet 23 to which a pipe 24 is attached in communication with the compartment 25 of the tank. The compartment 26 communicates with the engine 3 through a conduit or pipe 27.

From the foregoing it will be seen that the tank may be readily suspended on the offset 12 and dash to which it may be secured, that the capacity of the tank is such that the normal water supply is greatly augmented. The circulation from 26 may be traced through the pipe 27, through the engine to pipe 22, through the radiator, through pipe 24 back to 25 and through openings in partition 27 to 26, the capacity of the tank being such that liability of the engine being overheated will be greatly reduced if not wholly prevented.

To further assist in cooling the engine, the sides 28 of the hood may be hinged at 29 and 30 by the ordinary clasps so they will swing outwardly from the bottom.

I have shown angles 31 secured to the bottom of the tank 4 and hinged to said angles, ordinary spacing hasps 32 provided with heads 33 adapted to engage the key hole slots 34 in the member 28 so said members may be held in the position shown in Fig. I. The hasps 32 also carry turn buttons 35 which when the sides 28 are closed, they project through the vertically elongated slots 36 and to be turned to secure the sides against displacement as shown in Fig. III.

The construction of the tank is such that it may be fastened to the boss in the radiator and bolted through the opening in the dash which are ordinarily present to receive the tie rod which fastens the radiator to the dash so as to maintain the proper distance for the hood top. The tank will be stiff enough to serve a dual purpose, not only as an auxiliary reservoir but also as a brace and tie between the radiator and dash.

From the foregoing it will be apparent that by providing a tank as an auxiliary reservoir for the radiator, that a normal supply of water for cooling purposes will be greatly augmented and that the tank can be so constructed and placed on the machine that it will not detract from its appearance.

Having thus described my invention what I claim as new therein and desire to secure by Letters-Patent, is:

1. In combination with the radiator and dash of a water cooled motor vehicle of auxiliary water reservoir having longitudinally projecting flanges extending beyond the end of the reservoir, means carried by the flanges for connecting the radiator and dash respectively and means for effecting communication between the reservoir and the radiator and between the reservoir and the engine.

2. In a water cooling system for motor vehicle engines, a brace between the dash board and the radiator, said brace comprising a hollow reservoir to receive water and constitute a part of the circulatory system, said brace having outstanding projections, and hinged side louvers adjustably engaging the projections.

3. In combination with a radiator and a dash of a water cooled motor vehicle, of an auxiliary water reservoir constituting the top of the hood and connecting the dash and the radiator, said reservoir having an offset ledge constituting a louver stop, and hinged louvers co-operating therewith.

In testimony whereof I affix my signature.

GEORGE L. SCHOFIELD.